Figure 1:
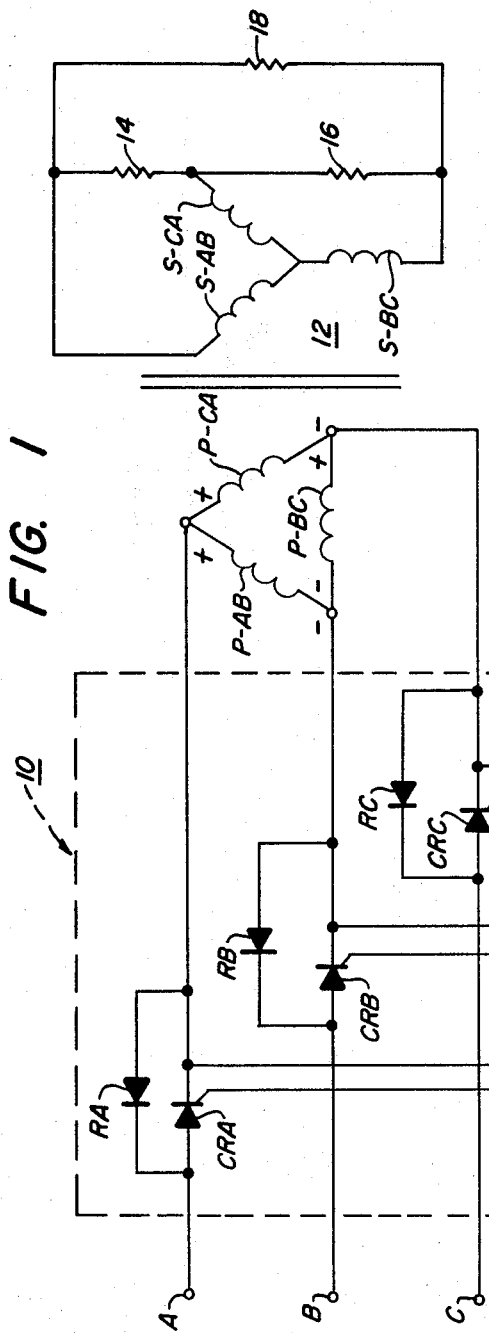
Figure 1:
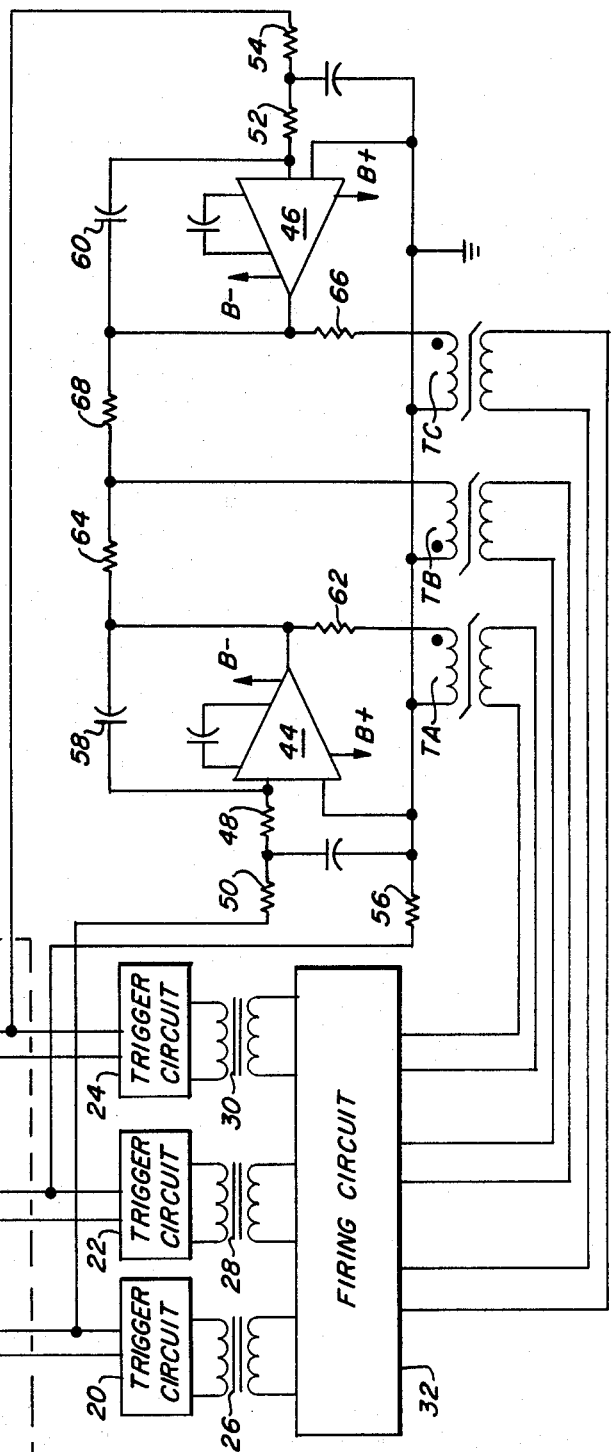

United States Patent
Blackmond

[15] 3,676,766
[45] July 11, 1972

[54] MULTIPHASE ALTERNATING CURRENT REGULATION SYSTEM FOR TRANSFORMER-COUPLED LOADS

[72] Inventor: Ronald C. Blackmond, Allison Park, Pa.
[73] Assignee: Robicon Corporation, Pittsburgh, Pa.
[22] Filed: Dec. 11, 1970
[21] Appl. No.: 97,260

[52] U.S. Cl. ...................323/6, 219/114, 323/22 SC, 323/24, 323/34
[51] Int. Cl. .......................G05f 1/38, G05f 1/56
[58] Field of Search ..................219/114, 131 R; 307/252 Q, 307/252 T; 323/6, 16, 17, 19, 22 SC, 24, 25, 34, 36

[56] References Cited

UNITED STATES PATENTS

| | | | |
|---|---|---|---|
| 3,532,900 | 10/1970 | Rhyne, Jr. | 323/24 X |
| 2,634,396 | 4/1953 | Solomon | 323/36 X |
| 3,189,810 | 6/1965 | MacGregor | 323/22 SC |
| 3,317,813 | 5/1967 | Schaefer | 323/34 X |
| 3,450,983 | 6/1969 | Koppelmann et al. | 219/131 X |
| 3,409,821 | 11/1968 | Bingley | 323/24 X |

Primary Examiner—A. D. Pellinen
Attorney—Brown, Murray, Flick & Peckham

[57] ABSTRACT

In a multiphase alternating current regulating system employing controlled rectifiers operated in accordance with phase commutation techniques, the improvement of circuitry for eliminating direct current components across loads supplied by the three-phase system which would otherwise occur when the loads become unbalanced.

7 Claims, 2 Drawing Figures

PATENTED JUL 11 1972

3,676,766

SHEET 1 OF 2

INVENTOR
RONALD C. BLACKMOND

By Brown Murray Flick
& Peckham
Attorneys

INVENTOR
RONALD C. BLACKMOND
Attorneys

MULTIPHASE ALTERNATING CURRENT REGULATION SYSTEM FOR TRANSFORMER-COUPLED LOADS

BACKGROUND OF THE INVENTION

While not limited thereto, the present invention finds particular utility in applications where three-phase power is supplied to unbalanced loads. An example is resistance heating furnaces or the like wherein the resistance of the heating elements connected across the three phases may vary one from the other. Normally, power is supplied to the resistance elements through a three-phase transformer, the primary windings of which are connected to a source of three-phase alternating current power through controlled rectifiers which operate in accordance with phase commutation techniques to vary the power supplied to the loads.

When the loads become unbalanced in a system of the type described above, a direct current component appears across one or more of the primary windings of the transformer, tending to saturate the transformer core. This direct current component, although of low voltage, can readily saturate the transformer because of the low resistance of the primary windings. Transformer saturation conceivably could be avoided by raising the primary winding resistance, but this is a totally impractical solution and would result in considerable dissipation of power. Another possibility of avoiding saturation is to increase the mass of the transformer core; but this materially increases the size and cost of the transformer.

SUMMARY OF THE INVENTION

In accordance with the present invention, means are provided for sensing the existence of any direct current component in the alternating current output voltage from a controlled rectifier current controller. The existence of a direct current component at the output of the controller as detected by the sensing means acts on a gate trigger unit to differentially change the firing phase angles of the controlled rectifiers in the three lines. The direction of the differential change in firing angles is such as to eliminate or reduce the direct current component.

In the embodiment of the invention shown herein, signals proportional to the voltages appearing across the three primary windings of a three-phase transformer are compared in integrating operational amplifiers such that when the voltages cancel each other, as when the loads are balanced, the outputs of the amplifiers do not change. The outputs of the operational amplifiers, in turn, control the phase firing angles of the controlled rectifiers in the current controller. As long as the outputs from the integrating amplifiers do not change, as when the loads are balanced, the phase firing angles will not be altered by the direct current sensing apparatus. However, when the loads become unbalanced, the firing angles are varied until the direct current component, which caused the change in firing angle, no longer persists.

The above and other objects and features of the invention will become apparent from the following detailed description taken in connection with the accompanying drawings which form a part of this specification, and in which:

FIG. 1 is a schematic circuit diagram of one embodiment of the invention; and

Figure 2:
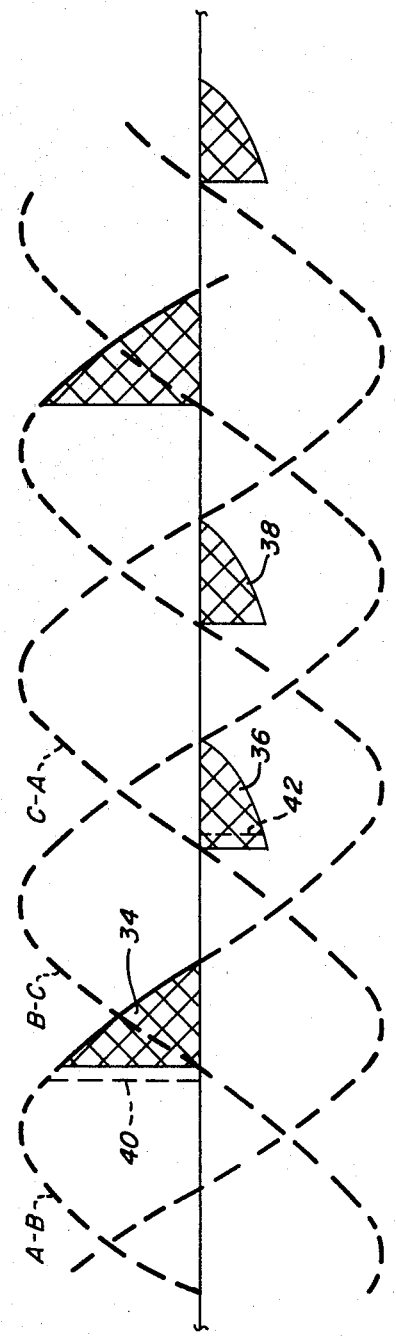

FIG. 2 comprises waveforms illustrating the operation of the circuit of FIG. 1.

With reference now to the drawings, and particularly to FIG. 1, three input terminals A, B and C are shown adapted for connection to a three-phase power supply, not shown. The input terminals A, B and C are connected through a current controller, enclosed by broken lines and identified by the reference numeral 10, to the primary windings P–AB, P–BC and P–CA of a three-phase transformer 12. The secondary windings S–AB, S–BC and S–CA are connected to three loads schematically illustrated as resistors 14, 16 and 18. The three primary windings are connected in a delta-configuration as shown whereas the three secondary windings are connected in a Y-configuration. As will be understood, delta-delta, Y-delta or Y—Y configurations could be used equally as well.

The current controller 10 includes three semiconductive controlled rectifiers CRA, CRB and CRC all poled to conduct current in the same direction. In shunt with the controlled rectifiers CRA–CRC are three rectifiers RA, RB and RC poled to conduct current in the opposite direction. The cathodes and gates of the controlled rectifiers CRA, CRB and CRC are connected to three trigger circuits 20, 22 and 24 in accordance with usual practice, the trigger circuits being connected through transformers 26, 28 and 30 to a control or firing circuit 32.

The three controlled rectifiers CRA through CRC operate in accordance with well known phase commutation techniques. That is, the firing circuit is adapted to cause the rectifiers to fire after a predetermined time elapse following the initiation of each half cycle of one polarity of the applied waveform. The rectifier will continue to conduct until the voltage thereacross drops to zero, whereupon the rectifier is cut off until the next cycle of the same polarity.

If it is assumed that rectifier CRA has fired, current will flow from terminal A through the controlled rectifier CRA, the primary winding P–AB and rectifier RB back to the terminal B. In this process, the total voltage appears across the winding P–AB with the polarity shown in FIG. 1; while half voltage appears across windings P–BC and P–CA in series. Assuming that the resistances of all of the primary windings are the same, the total voltage between terminals A and B will appear across the primary winding P–AB; one-half of the total voltage will appear across winding P–BC; and one-half of the total voltage will appear across winding P–CA. This is perhaps best shown in FIG. 2 wherein the waveforms A–B, B–C and C–A represent the three phases of the applied power source. It will be assumed that the controlled rectifier CRA, as well as controlled rectifiers CRB and CRC, are set to fire at 140° following initiation of the positive half cycle of each applied waveform. This causes the controlled rectifier to conduct from 140° to 180°, the net voltage across winding P-AB being indicated by the shaded area identified by the reference numeral 34 in FIG. 2.

After controlled rectifier CRA fires, controlled rectifier CRB will fire, thereby producing a voltage drop across winding P-BC equal to total voltage drop across terminals B and C, and a voltage drop across winding P–AB equal to one-half the total voltage applied between terminals B and C. Note that the voltage now appearing across winding P–AB will be reversed in polarity with respect to that shown by numeral 34, which is the polarity existing when controlled rectifier CRA fires. Consequently, the voltage indicated by the shaded area 36 in FIG. 2 will appear across winding P–AB when controlled rectifier CRB fires. Finally, when controlled rectifier CRC fires, the total voltage drop between terminals A and C appears across primary winding P–CA whereas one-half of the total voltage appears across primary winding P–AB. This voltage is also reversed in polarity with respect to that shown by numeral 34. Therefore, when controlled rectifier CRC fires, a second voltage identified by the reference numeral 38 in FIG. 2 will appear across winding P–AB. (A similar set of conditions applies for windings P–BC and P–CA.)

As long as the positive area 34 of FIG. 2 is equal to the sum of the negative areas 36 and 38, no net direct current component will appear across the winding P–AB. However, if the loads 14, 16 and 18 should become unbalanced for one reason or another, this condition will no longer persist. That is, the area 34 will no longer be equal to the sum of the areas 36 and 38 and a direct current component will appear across winding P-AB which tends to saturate the core of transformer 12. This net direct current voltage, while of relatively low value, can readily saturate the core by virtue of the fact that the resistance of the primary winding is extremely low. Hence, a large current surge occurs which is not transmitted to the secondary windings and can damage the semiconductive elements. As was mentioned above, the possibility of saturation can conceivably be reduced by increasing the resistance of the primary windings; however this causes a wasteful dissipation of energy. Avoidance of saturation can also be achieved by increasing the mass of the transformer core; however this materially increases the cost and size of the transformer.

In accordance with the present invention, a net direct current voltage in anY of the primary windings of transformer 12 is sensed and the firing phase angles of the controlled rectifiers CRA–CRC varied such that the net direct current voltage again approaches zero. This can be seen, for example, by reference to FIG. 2. Let us assume that the waveform A–B decreases in amplitude because of unbalanced loads. Under these circumstances, the area 34 will no longer be balanced by the sum of the areas 36 and 38 and a net direct current component will appear across winding P–AB. However, by advancing the firing angle of controlled rectifier CRA to the dotted line position indicated by the reference numeral 40, and by retarding the firing angle of one or both of the controlled rectifiers CRB and CRC as indicated by the dotted line 42, the sum of the areas can again be brought back to a condition where their net value is zero and the direct current component no longer persists.

Circuitry for accomplishing the foregoing is shown in FIG. 1 and includes a pair of integrating operational amplifiers 44 and 46. One input terminal of the operational amplifier 44 is connected through resistors 48 and 50 to the cathode of controlled rectifier CRA. Similarly, one of the input terminals of operational amplifier 46 is connected through resistors 52 and 54 to the cathode of controlled rectifier CRC. The cathode of controlled rectifier CRB is connected through resistor 56 to the other or bottom inputs of both amplifiers 44 and 46. Hence, amplifier 44 compares the voltages on the cathodes of controlled rectifiers CRA and CRB; whereas amplifier 46 compares the voltages on the cathOdes of controlled rectifiers CRC and CRB.

Both amplifiers 44 and 46 are provided with feedback paths including integrating capacitors 58 and 60, respectively. The output of amplifier 44 is connected through resistor 62 to the primary winding on saturable core magnetic amplifier TA, and through resistor 64 to the primary winding on saturable core magnetic amplifier TB. The output of amplifier 46 is connected through resistor 66 to the primary winding on saturable core magnetic amplifier TC, and through resistor 68 to the primary winding on saturable core magnetic amplifier TB. The saturable core magnetic amplifiers TA, TB and TC are actually part of the firing circuit 32 and determine the point at which the controlled rectifiers CRA–CRC fire. That is, as the bias on the windings of magnetic amplifiers TA, TB and TC changes, the point at which the magnetic amplifiers saturate to fire the rectifiers is also varied. Note that the polarity of the windings on magnetic amplifiers TA and TC is reversed with respect to that of the winding on magnetIc amplifier TB. Furthermore, it should be noted that the resistance of resistors 64 and 68 is double that of resistors 62 and 66. Hence, when the output of operational amplifier 44 changes, for example, there will be a change in voltage across the winding of magnetic amplifier TB equal to one-half that across magnetic amplifier TA. Hence, the effect is to shift the firing angle of controlled rectifier CRA in one direction and that of controlled rectifier CRB in the other direction by virtue of the polarity reversal of the windings on magnetic amplifiers TA and TB. Furthermore, the shift for controlled rectifier CRB will be less than that for controlled rectifier CRA.

In the operation of the circuit, and with reference again to FIG. 2, let us assume that waveform A–B becomes low in amplitude. This causes a negative direct current component to appear at the cathode of controlled rectifier CRA with respect to the cathode of controlled rectifier CRB. That is, the cathode of controlled rectifier CRB becomes more positive with respect to the cathode of controlled rectifier CRA since the reflected or negative component of waveform A–B is reduced in area. As long as the sum of the areas of the waveforms applied to the two input terminals of integrating amplifier 44 are the same, the output of the amplifier will not vary. However, under the conditions assumed with the cathode of rectifier CRA having a net negative potential thereon with respect to the cathode of rectifier CRB, the amplifier 44 will integrate to vary the voltage across the winding of magnetic amplifier TA as well as the voltage across the winding of magnetic amplifier TB. At this point, however, it must be remembered that the voltage across the winding of magnetic amplifier TB is varied only one-half that across the winding of magnetic amplifier TA by virtue of the fact that resistor 62 is one-half the size of resistor 64.

At the same time, when the reflected component of waveform A–B decreases in area, a net positive component appears at the cathode of controlled rectifier CRC. This component, however, is compared with that on the cathode of controlled rectifier CRB which has also increased in the positive direction. Hence, the output from operational amplifier 46 does not change under these circumstances.

As the output from operational amplifier 44 increases, the firing angle of controlled rectifier CRA is advanced by the firing circuit 32 and that of controlled rectifier CRB is retarded until the sum of the areas 34, 36 and 38 shown in FIG. 1 is again equal to zero and the net direct current component disappears.

It will be appreciated, of course, that while the foregoing description has involved a consideration of the voltage across winding P–AB only, unbalancing of loads across the other two windings will produce the same net effect, always bringing the net direct current back to zero.

It can thus be seen that the present invention provides a means for preventing saturation of a three-phase transformer coupled to a controlled rectifier voltage control circuit under all conditions. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a current regulating system of the type in which alternating current is supplied through controlled rectifiers to a plurality of loads and wherein each of said rectifiers has an anode terminal and a cathode terminal; the combination of a controllable firing circuit connected to said controlled rectifiers whereby current supplied to the load is controlled by varying the firing angle of said controlled rectifiers, operational amplifier meanS coupled to said controlled rectifiers for comparing the amplitudes of the voltages appearing at corresponding terminals of at least two of said controlled rectifiers, said operational amplifier means being adapted to produce an output signal when the amplitudes of the voltages compared thereby are not the same indicating the existence of a direct current component across a load, and means including saturable magnetic amplifying means coupled to the output of said operational amplifier means and responsive to said output signal for varying the firing angles of said controlled rectifiers until said direct current component no longer exists.

2. The current regulating system of claim 1 wherein the current is supplied in a three-phase system and wherein said operational amplifier means includes two operational amplifiers one of which compares the amplitudes of a first and second of said phases and the second of which compares the amplitudes of the second and third of said phases.

3. The current regulating system of claim 2 wherein said saturable magnetic amplifying means includes three separate saturable magnetic amplifiers, two of which are connected to the output of an associated one of said operational amplifiers through respective first impedance elements and the third of which is connected to the outputs of both of said operational amplifiers through respective second impedance elements.

4. The current regulating system of claim 3 wherein said second impedance elements have impedance values twice those of the first impedance elements.

5. The current regulating system of claim 3 wherein said first and second magnetic amplifiers act to shift the firing angle of said controlled rectifiers in one direction while said third magnetic amplifier acts to shift said firing angle in the opposite direction.

6. The current regulating system of claim 1 including transformer means for supplying alternating current from said controlled rectifiers to a plurality of loads.

7. The current regulating system of claim 1 including diodes connected in shunt with said controlled rectifiers.

* * * * *